(12) United States Patent
Bennie et al.

(10) Patent No.: US 11,014,443 B2
(45) Date of Patent: May 25, 2021

(54) FUEL DELIVERY TO A VEHICLE

(71) Applicant: Ford Global Technologies, LLC, Dearborn, MI (US)

(72) Inventors: Brian Bennie, Sterling Heights, MI (US); Cynthia M. Neubecker, Westland, MI (US); Brad Alan Ignaczak, Canton, MI (US); Somak Datta Gupta, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/498,425

(22) PCT Filed: Mar. 28, 2017

(86) PCT No.: PCT/US2017/024499
§ 371 (c)(1),
(2) Date: Sep. 27, 2019

(87) PCT Pub. No.: WO2018/182576
PCT Pub. Date: Oct. 4, 2018

(65) Prior Publication Data
US 2020/0108713 A1   Apr. 9, 2020

(51) Int. Cl.
*B60K 15/04* (2006.01)
*B60K 15/03* (2006.01)

(52) U.S. Cl.
CPC .... *B60K 15/04* (2013.01); *B60K 2015/03197* (2013.01); *B60K 2015/03217* (2013.01); *B60K 2015/03342* (2013.01); *B64C 2201/12* (2013.01)

(58) Field of Classification Search
CPC .......... B60K 2015/03144; B60K 15/04; B60K 2015/03197; B64C 2201/12
USPC ........ 137/571; 180/314; 244/135 A; 141/363
See application file for complete search history.

(56) References Cited

U.S. PATENT DOCUMENTS

| | | | |
|---|---|---|---|
| 5,320,147 A | 6/1994 | Jamrog | |
| 8,511,606 B1 | 8/2013 | Lutke et al. | |
| 8,860,362 B2 | 10/2014 | Kamen et al. | |
| 9,045,218 B2 | 6/2015 | Childress et al. | |
| 9,305,280 B1 | 4/2016 | Berg et al. | |
| 9,409,644 B2 | 8/2016 | Stanek et al. | |
| 9,778,653 B1* | 10/2017 | McClintock | B60L 53/65 |
| 10,508,743 B2* | 12/2019 | Wakayama | F16K 37/0041 |
| 10,622,840 B2* | 4/2020 | Chung | H02J 50/80 |

(Continued)

FOREIGN PATENT DOCUMENTS

DE    102014213023 A1    1/2016

OTHER PUBLICATIONS https://www.allaboutcircuits.com/textbook/digital/chpt-4/switch-types/ (converted to .pdf), published Oct. 6, 2015 (Year: 2015).*

(Continued)

*Primary Examiner* — Timothy P. Kelly
*Assistant Examiner* — Christopher M Afful
(74) *Attorney, Agent, or Firm* — Frank Lollo; Bejin Bieneman PLC

(57) ABSTRACT

A system that includes a vehicle fuel-receiver comprising a port located on a vehicle surface; and an onboard computer programmed to: send a fuel delivery request to an unmanned aerial vehicle (UAV); actuate the port to permit the UAV to deliver fuel; and instruct a communication module to transmit a beacon signal to the UAV.

20 Claims, 8 Drawing Sheets

(56) References Cited

U.S. PATENT DOCUMENTS

| | | | |
|---|---|---|---|
| 10,727,697 B2* | 7/2020 | Pavlovsky | H02M 7/217 |
| 2007/0084193 A1* | 4/2007 | Levin | F01N 3/208 |
| | | | 60/283 |
| 2010/0321011 A1* | 12/2010 | Small | B64D 39/04 |
| | | | 324/239 |
| 2012/0139225 A1* | 6/2012 | Sonderegger | B60K 15/03 |
| | | | 280/834 |
| 2014/0183300 A1 | 7/2014 | MacCulloch et al. | |
| 2015/0123462 A1* | 5/2015 | Kamradt | B67D 7/78 |
| | | | 307/9.1 |
| 2015/0181819 A1 | 7/2015 | Celebi et al. | |
| 2015/0353206 A1 | 12/2015 | Wang | |
| 2016/0009413 A1 | 1/2016 | Lee et al. | |
| 2016/0225105 A1 | 8/2016 | Hill | |
| 2016/0272063 A1 | 9/2016 | Sekihara et al. | |
| 2016/0311410 A1* | 10/2016 | Donzis | B60K 15/05 |
| 2016/0355258 A1 | 12/2016 | Williams et al. | |
| 2017/0010624 A1 | 1/2017 | Carpenter | |
| 2018/0079296 A1* | 3/2018 | Wakao | B60K 15/04 |
| 2018/0180001 A1* | 6/2018 | Kamikozawa | F02M 25/089 |

OTHER PUBLICATIONS

International Search Report and Written Opinion dated Jun. 21, 2017, Appl. No. PCT/US2017/024499.

* cited by examiner

500

FUEL DELIVERY TO A VEHICLE

CROSS-REFERENCE TO RELATED APPLICATION

This application is related to PCT Patent Appl. No. PCT/US2017/24500, (65080-2358T) entitled "FUEL DELIVERY TO A VEHICLE", filed Mar. 28, 2017, the complete contents of which are hereby incorporated herein by reference in their entirety.

BACKGROUND

Modern vehicles can be powered by combustible fuel, electricity, or a combination thereof. In some circumstances, vehicles may run out of fuel or electrical charge and become stranded.

DETAILED DESCRIPTION

Figure 1:
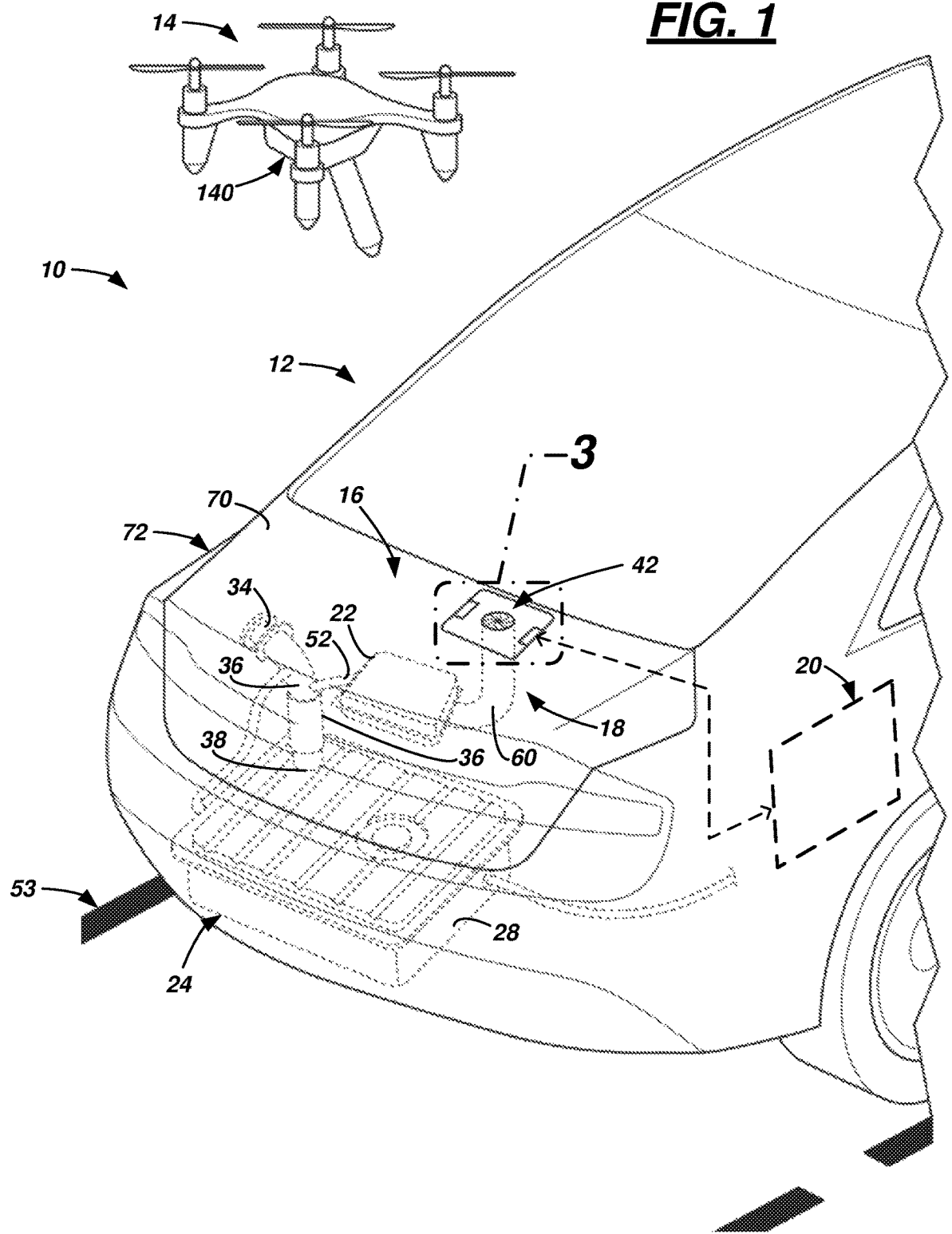
FIG. 1 is a perspective view of a portion of a mobile refueling system that includes an unmanned aerial vehicle (UAV) and a vehicle having an extend-range fueling system.

A mobile refueling system is described that includes an unmanned aerial vehicle (UAV) and a vehicle that includes an extend-range fueling system. According to one illustrative example, the extend-range fueling system can include a vehicle fuel-receiver comprising a port located on a vehicle surface; and an onboard computer programmed to: send a fuel delivery request to an unmanned aerial vehicle (UAV); actuate the port to permit the UAV to deliver fuel; and instruct a communication module to transmit a beacon signal to the UAV.

According to the at least one example set forth above, the fuel-receiver further includes a chamber that is in fluid communication with the port via a first passage, wherein the chamber is in fluid communication with a main fuel tank via a second passage.

According to the at least one example set forth above, the first passage includes a valve that is electronically-actuatable by the computer.

According to the at least one example set forth above, the valve includes a spring that urges the valve to a closed position, wherein, when actuated by the computer, the valve moves to an open position, wherein, when not actuated by the computer, the valves moves to the closed position.

According to the at least one example set forth above, the second passage includes a valve that is electronically-actuatable by the computer, wherein the computer is programmed to move the valve to an open position when computer determines the port to be in a closed position.

According to the at least one example set forth above, the second passage is in fluid communication with a fuel filler passage that includes a fuel filler opening for a fuel hose nozzle.

According to the at least one example set forth above, a base region of the chamber is sloped relative to a roadway surface.

According to the at least one example set forth above, the chamber includes a fuel sensor that detects a quantity of fuel in the chamber.

According to the at least one example set forth above, the port includes one or more movable elements located at an opening to the first passage.

According to the at least one example set forth above, the port includes an iris diaphragm coupled to the computer, wherein a plurality of blades of the diaphragm are electronically movable between an open position and a closed position.

According to the at least one example set forth above, the fuel-receiver further includes an evaporative control system that recaptures fuel vapor from the chamber.

According to the at least one example set forth above, the fuel-receiver further includes a landing pad located on the surface, wherein the pad at least partially circumferentially encloses the port.

According to the at least one example set forth above, the fuel-receiver further includes at least one locking feature at the pad.

According to the at least one example set forth above, the at least one feature is coupled to the computer, wherein the computer is programmed to electronically control the at least one feature to move between a UAV retaining position and a UAV releasing position.

According to the at least one example set forth above, the fuel-receiver further includes a chamber defined by the port and a plurality of walls that carry a pair of electrical terminals.

According to the at least one example set forth above, the fuel-receiver further includes a switch and a charge controller, wherein the switch is coupled to the controller, at least one of the terminals, and a primary vehicle battery, wherein, when the switch is in a first position, current passes through the switch to the battery, wherein, when the switch is in a second position, current is inhibited from passing therethrough.

According to the at least one example set forth above, the switch is coupled to the computer, wherein the computer is programmed to electronically actuate the switch.

According to the at least one example set forth above, the port includes one or more bay doors hinge-ably coupled to at least one of the plurality of walls.

According to the at least one example set forth above, the fuel-receiver further includes a port that comprises a landing pad, a receiver coil circuit, and a regulator circuit which further is coupled to a primary vehicle battery.

According to the at least one example set forth above, the fuel-receiver further includes a switch electronically-actuatable by the computer and coupled between the coil circuit and the battery, wherein, when the switch is in a closed position, the coil circuit is coupled electrically to the battery.

According to the at least one example, a computer is disclosed that is programmed to execute any combination of the examples set forth above.

According to the at least one example, a computer program product is disclosed that includes a computer readable medium storing instructions executable by a computer processor, wherein the instructions include any combination of the instruction examples set forth above.

Now turning to the figures, wherein like numerals indicate like parts throughout the several views, there is shown a mobile refueling system 10 that includes a vehicle 12 and an unmanned aerial vehicle (UAV) 14. The vehicle 12 includes an extend-range fueling system 16 that permits the UAV 14 to deliver fuel to the vehicle 12 while the vehicle is stationary or in motion, thereby permitting the vehicle 12 to extend its driving range without stopping at a filling station to refuel. The fuel delivered by UAV 14 can take the form of, among other things, liquid fuel, an electric battery, or even electrical charge, as will be explained in greater detail below.

Referring generally to FIGS. 1-4, the vehicle 12 may be a passenger car or any other suitable vehicle. For example, vehicle may be a truck, sports utility vehicle (SUV), recreational vehicle, a bus or train (e.g., a school bus), marine vessel, aircraft, or the like that includes the extend-range fueling system 16. Vehicle 12 may be operated in any one of a number of autonomous modes. In at least one example, vehicle 12 may operate in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention.

According to one example, vehicle 12 comprises a combustion engine (not shown) that receives liquid fuel from the extend-range fueling system 16. The system 16 includes a fuel-receiver 18 adapted to receive fuel from UAV 14, as well as an onboard computer 20 programmed to operate fuel-receiver 18. As used herein, a fuel-receiver includes any mechanical or electro-mechanical structure and/or components which are arranged, assembled, etc. to facilitate a transfer of fuel from the UAV 14 to the vehicle 12. And fuel, as used herein, should be construed broadly to include fluid fuel (e.g., such as combustible liquid fuels) and electrical energy (e.g., including but not limited to battery cells and wireless electrical charging). In the present example, the fuel-receiver 18 comprises, among other things, a chamber or reservoir 22 and a number of elements to facilitate communication between chamber 22 and a main fuel tank 24—the chamber 22 being adapted to receive and store liquid fuel received from the UAV 14. As will be explained more below, other types of fuel-receivers 18 are also possible.

The main fuel tank 24 comprises a wall 28 of any suitable size and shape that defines an enclosed volume 30 for carrying liquid fuel. The tank 24 may include a number of features such as a fuel level sensor 32 which may be electrically coupled to computer 20 via connection $S_{MAIN}$, as well as other features not shown (e.g., such as a fuel pump, a slosh bucket, one or more jet pumps, a fuel filter, etc.). Since the design and construction of main fuel tanks is generally known in the art, details of tank 24 will not be described further herein.

A fuel filler opening 34, adapted to receive a fuel hose nozzle (not shown), may be in communication with main fuel tank 24 via a fuel filler passage 36 which extends between the opening 34 and a lower opening 38 in the wall 28 of the tank. A fuel cap 40 may be couplable to the fuel filler opening 34; however, examples exist without cap 40 as well. An at least partially vertical orientation of the passage 36 to the tank 24 (relative to a roadway surface 53) permits gravity to feed liquid fuel, received by a fuel hose nozzle, into the volume 30 thereof.

In at least one example, chamber 22 is embedded within the vehicle 12 and in communication with a port 42. As used herein and as described more below, a port is any mechanical element on a surface 70 of the vehicle 12 that is arranged, assembled, etc. to permit the passage of fuel therethrough, e.g., when received from the UAV 14 (e.g., permitting liquid fuel to pass through, an auxiliary battery to pass therethrough, a wireless charge to pass therethrough, etc.).

The chamber 22 may include a wall 44 that defines another enclosed volume 46 for receiving and storing liquid fuel—and volume 46 may be smaller than main fuel tank volume 30. In at least one example, the chamber 22 includes a fuel sensor 47 which may be coupled electrically to the computer 20 via connection $S_{RES}$ so that the computer 20 receives an indication of the quantity of fuel in the chamber 22. The sensor 47 may be a weight sensor, a volume sensor (e.g., such as a fuel level sensor), a combination thereof, or the like. Other sensors could be used in chamber 22 as well—e.g., including sensors which detect fuel type, pressure within the chamber 22, etc.

A base region 48 of the chamber wall 44 may have an opening 50 to a passage 52 that permits fluid communication between the chamber 22 and the tank 24. The base region 48 may be sloped or the like to promote drainage of the chamber 22—e.g., sloped relative to a horizontal plane (not shown) extending through vehicle 12 that is parallel to roadway surface 53 (e.g., wherein opening 50 is at a lower portion of a sloped region). In the illustrated example, the passage 52 extends to the fuel filler passage 36; however, this is not required (e.g., the passage 52 instead could extend to the fuel tank 24 itself).

The passage 52 may include a valve 54 (e.g., a one-way valve) which is electronically actuatable by the onboard computer 20 via connection $V_1$—thereby selectively permitting fuel to flow (e.g., via gravity) from the chamber 22 to the fuel tank 24 when the valve 54 is in an open position and inhibiting fuel flow therebetween when the valve 54 is in a closed position. One non-limiting example of such a valve is a solenoid valve; however, other examples exist as well.

In at least one example, the chamber 22 also may include a fuel filter 56—e.g., shown here covering opening 50 near base region 48; however of course, this is merely an example and is not required. The filter 56 may strain particles and other contaminants from the fuel as it drains to the main fuel tank 24, which is discussed in greater detail below.

A passage 60 may extend between the port 42 and an opening 62 in a top region 64 of the chamber wall 44. The passage 60 also may have a valve 66 (e.g., a one-way valve) which may be actuated selectively by the onboard computer 20 via connection $V_2$. According to one example, the valve 66 may be identical to valve 54. And in at least one example, valve 66 further may comprise a spring 68 which urges or biases the valve 66 to the closed position when a nozzle (e.g., from UAV 14) is not located in passage 60. Thus, as will be explained in greater detail below, should the UAV nozzle unexpectedly be removed from the passage 60, the valve 66 may move to the closed position thereby inhibiting contaminants from entering the chamber 22. The passage 60 also may be at least partially vertically oriented to promote fuel received from the UAV 14 to feed downwardly by gravity into the chamber 22.

Fuel-receiver 18 further may comprise port 42, which may be any mechanism adapted to receive fuel from the UAV 14. In the instant example, port 42 acts as a controllable gateway to selectively permit fuel to fill chamber 22. The port 42 may be located at an exterior surface 70 (e.g., a so-called class-A surface) of a vehicle body 72, wherein the body 72 may be of unibody, body-on-frame, or other suitable construction.

Figure 2:
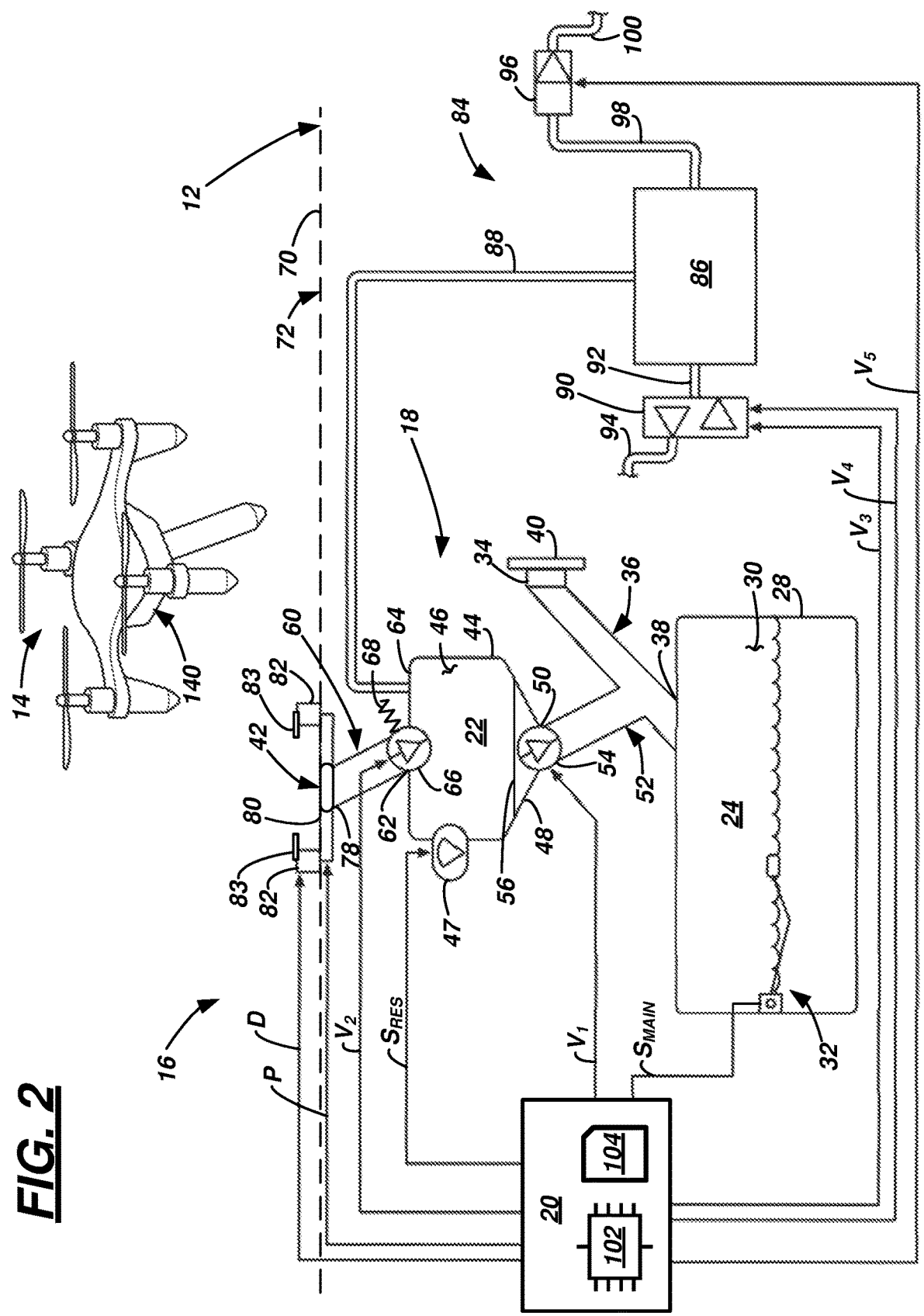
FIG. 2 is a schematic view of one example of the extend-range fueling system.
Figure 3:
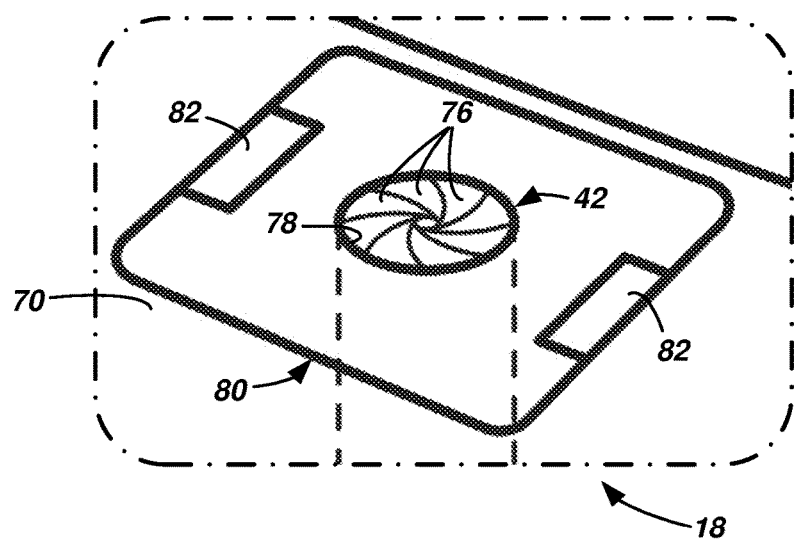
FIG. 3 is an enlarged view of a portion of the extend-range fueling system shown in FIG. 1.

As best shown in FIG. 3, port 42 may include one or more movable elements 76 located at an opening 78 of the passage 60 (e.g., at surface 70). The movable element(s) 76 may be selectively electronically actuated by onboard computer 20 via connection P (FIG. 2). In some examples, the computer 20 provides an electrical signal to a solenoid (not shown) on the port 42 which drives the movable element(s) 76 to an open position, wherein, when the computer 20 ceases to provide the signal, the solenoid drives the movable element(s) 76 to a closed position again. In this manner, when the movable element(s) 76 are in the open position, the port 42 may be actuated to permit delivery of fuel from the UAV 14; and when the element(s) 76 are in the closed position, the port 42 may inhibit fuel delivery therefrom. This of course is merely one example; other actuatable components can be used instead or addition to the solenoid described above.

In the illustration, movable elements 76 comprise multiple blades arranged to form an iris diaphragm, wherein the blades rotatably move collectively, circumferentially inwardly (e.g., to a center thereof) to close the diaphragm and rotatably move collectively, circumferentially outwardly to open the diaphragm. Further, computer 20 may control inwardly and outwardly movements (e.g., via connection P). In this example, when the blades are in a fully opened position, the opening 78 to passage 60 may be exposed sufficiently to receive a hose of the UAV 14, and when the blades are in a fully closed position, the opening 78 may be inaccessible. Other electronically-actuatable examples exist as well; non-limiting examples include elements 76 that, in response to electronic actuation, otherwise slide, pivot, etc.

In other examples, movable element(s) 76 may be actuated without electronics. For example, elements 76 may comprise one or more resilient members that deform from a nominal position to expose opening 78—when pressure from a UAV nozzle is applied thereto. And for example, when the nozzle is removed, such elements 76 resiliently may return to the nominal position inhibiting access to opening 78. Other examples are also possible.

Fuel-receiver 18 further may comprise a landing pad 80 which at least partially circumferentially encloses the port 42. Pad 80 may include a slip-resistant film or coating adapted to protect vehicle body surface 70 from scuffs, scratches, and the like while also providing stability to UAV 14 after it has landed on vehicle 12. In at least one example, the landing pad 80 may include one or more locking features 82 adapted to couple with corresponding locking features on the UAV 14, as discussed more below. According to one example, the locking feature(s) 82 may include movable tabs 83 which can extend over a retaining element of the UAV (e.g., from a releasing position (open) to a retaining position (closed)). According to at least one example, the one or more locking features may be electronically actuatable by computer 20 via connection D—e.g., in this manner, with the locking feature(s) 82 in a first (retaining) position, any UAV without authorization from computer 20 may be unable to secure itself to vehicle 12, and with the locking feature(s) 82 in a second (releasing) position, authorized UAV 14 may be able to land on pad 80, and computer 20 then may close the feature(s) 82 to secure the UAV 14 to the pad 80. Locking features 82 may move in other ways as well; however, electronically-actuatable features 82 are not required. For example, locking feature(s) 82 may comprise a detent device which mechanically secures or stabilizes the UAV 14 when docked on the landing pad 80.

According to at least one example (as shown in FIG. 2), the fuel-receiver 18 further may comprise an evaporative control system 84 which is coupled to the chamber 22 (and/or the main fuel tank 24). As shown, the system 84 may include a charcoal canister 86 (for filtering fuel). Canister 86 may be in fluid communication with chamber 22 via a passage 88, wherein passage 88 facilitates the movement of fuel vapor from chamber 22 to canister 86. The canister 86 also may be in fluid communication with a two-way vent valve 90 via a passage 92 which permits outside air to enter the canister 86 via passages 92, 94—or which similarly permits air from the canister 86 to vent to the outside air (e.g., via passages 92, 94). Valve 90 may be selectively electronically actuatable by computer 20 via connections $V_3$ (out), $V_4$ (in)—to control which direction air flows therethrough. Canister 86 may be in fluid communication with the engine via a purge valve 96 and passages 98, 100. Further, purge valve 96 may be selectively electronically actuatable by computer 20 via connection $V_5$. Thus, evaporated fuel from chamber 22 may be recaptured and condensed in canister 86 by control of the two-way vent valve 90 and consequently delivered to the engine for combustion via the purge valve 96, using techniques known in the art. In at least one example, system 84 is shared with main fuel tank 24; however, this is not required (e.g., in at least one example, evaporative control system 84 is dedicated to fuel-receiver 18, such as the one shown in FIG. 2).

Figure 4:
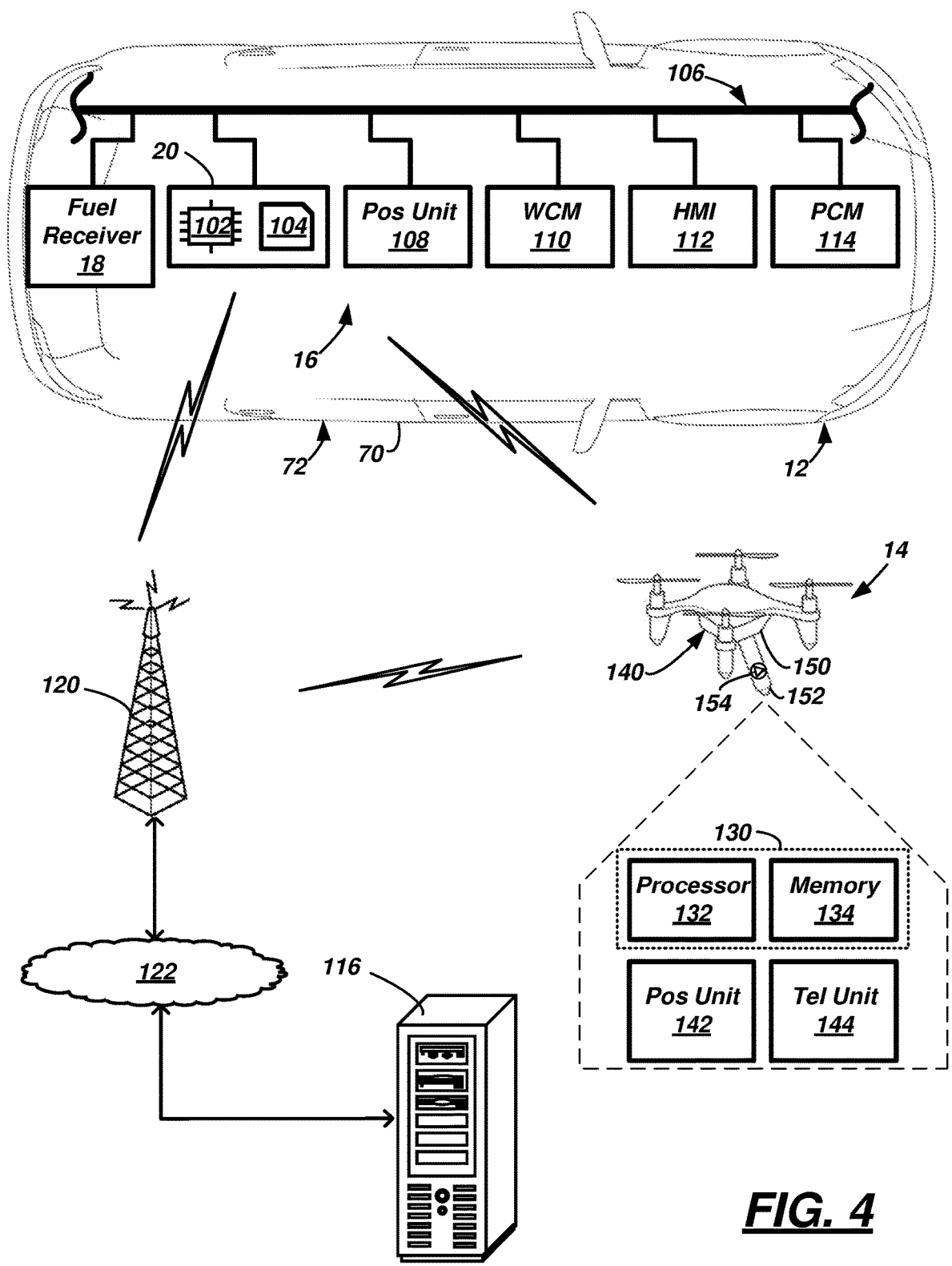
FIG. 4 is a schematic view of the mobile refueling system.

Onboard computer 20 may be a single computer or multiple computing devices—e.g., shared with other vehicle systems and/or subsystems, including one or more of those shown in FIG. 4. Computer 20 may be programmed to control fuel-receiver 18—e.g., computer 20 may comprise one or more processors and/or processing circuits 102 which are coupled to memory 104. As each processor 102 may be identical, only one will be described; thus, it should be appreciated that while one is shown, this is for illustrative purposes only. Processor 102 can be any type of device capable of processing electronic instructions, non-limiting examples including a microprocessor, a microcontroller or controller, an application specific integrated circuit (ASIC), etc.—just to name a few. In general, computer 20 may be programmed to execute digitally-stored instructions, which may be stored in memory 104, which enable the computer 20, among other things: to determine to initiate a fuel delivery request; to send the fuel delivery request based on the determination; to validate a fuel type based on a message from UAV 14; to coordinate a docking procedure of UAV 14; to control one or more locking features 82 to retain UAV 14 to the vehicle 12 (e.g., while the UAV delivers fuel thereto); to control valve 66 to permit reception of fuel into chamber 22; to control valve 54 to dispense stored fuel into main tank 24; to control either of vent valves 90 to recapture evaporated fuel from chamber 22; to control purge valve 96 to provide recaptured fuel (in canister 86) to a vehicle engine; to determine an amount of fuel within the chamber 22; to determine an amount of fuel within the main fuel tank 24; to coordinate an undocking procedure of the UAV 14; and the like.

Memory 104 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 104 may store one or more computer program products which may be embodied as software, firmware, or the like.

As shown in FIG. 4, extend-range fueling system 16 may comprise other components as well including but not limited to a wired or wireless network connection 106 that communicatively couples the onboard computer 20, a positioning unit 108 for determining location data of vehicle 12, a wireless communication module 110 for communicating with the UAV 14 and other electronic devices, a human-machine interface (HMI) 112, and a powertrain control module 114 that is adapted to control vehicle steering and drive.

Network connection 106 may include one or more of a controller area network (CAN) bus, Ethernet, Local Interconnect Network (LIN), or the like. Other examples also exist. For example, alternatively or in combination with e.g., a CAN bus, connection 106 could comprise one or more discrete wired or wireless connections. For example, network connection 106 may include one or more discrete connections—e.g., including but not limited to connections $V_1$-$V_5$, $S_{MAIN}$, $S_{RES}$, P, and D. In other fuel-receiver examples (described below), connection 106 may include one or more buses, any suitable discrete connections between a computer and fuel-receiver components, or any combination thereof.

Positioning unit 108 includes any suitable electronic device used to determine location data and/or heading data of vehicle 12. Non-limiting examples of positioning unit 108 include a Global Positioning System (GPS) device or a Global Navigation Satellite System (GLONASS) device. As described below, when making a fuel delivery request, computer 20 may receive location and/or heading data from positioning unit 108 and provide to the UAV 14. A non-limiting example of location data includes latitude and longitude (LAT/LONG) data; and a non-limiting example of heading data includes a vehicle speed and direction—e.g., which may be relative to a determinable roadway (e.g., which is determined using, at least in part, location data).

Wireless communication module 110 may be any suitable telematics computing device configured to wirelessly communicate with other electronic devices, including a remote server 116. Such wireless communication may include use of cellular technology (e.g., LTE, GSM, CDMA, and/or other cellular communication protocols), short range wireless communication technology (e.g., using Wi-Fi, Bluetooth, Bluetooth Low Energy (BLE), dedicated short range communication (DSRC), and/or other short range wireless communication protocols), or a combination thereof. Such communication includes so-called vehicle-to-vehicle (V2V) and vehicle-to-infrastructure (V2I) communications as well—all of which will be appreciated by those skilled in the art. For example, module 110 may include an embedded cellular chipset or may facilitate cellular communication using the chipset of a mobile device (not shown) carried by a user of vehicle 12 (e.g., a cellular phone, Smart phone, etc.). Module 110 may be programmed to receive from onboard computer 20, via the connection 106, a wireless transmission instruction coupled with a fuel delivery request, and based on receipt of the instruction and the request, wirelessly transmit the request to UAV 14—e.g., either directly or indirectly via remote server 116. In addition, as described more below, module 110 may transmit a beacon signal according to any suitable short range wireless communication protocol or technique—e.g., to assist UAV 14 in precisely locating vehicle 12.

In the description below, onboard computer 20 may communicate wirelessly with UAV 14 and other wireless devices via wireless communication module 110. It will be appreciated that when the description states that computer 20 transmits a wireless message, instruction or the like (e.g., to the UAV 14 or other computing device) that the message, instruction, or the like first may be sent to the module 110 via network connection 106. Thereafter, the module 110 may prepare and/or convert the message, instruction, or the like for wireless transmission, and the wireless communication module 110 may perform the actual wireless transmission or sending of the message, instruction, or the like. Similarly, it will be appreciated that when the description states that computer 20 receives a wireless message, data, or the like (e.g., from the UAV 14 or other computing device) that the message, instruction, or the like actually may be received first wirelessly at the module 110, the module 110 may prepare and/or convert the message, instruction, or the like for transmission over the network connection 106, and the wireless communication module 110 may send the prepared and/or converted message, instruction, or the like to the computer 20 (or other computing device) over the network connection 106.

Human-machine interface (HMI) 112 may include any suitable input and/or output devices such as switches, knobs, controls, etc.—e.g., on an instrument panel, steering wheel, etc. of vehicle 12—which are coupled communicatively to onboard computer 20. In one non-limiting example, HMI 112 may comprise an interactive touch screen or display which provides an interactive interface for a vehicle user to place a fuel delivery request.

Powertrain control module 114 may include any suitable computing device(s) programmed to control vehicle steering and drive (e.g., forward and reverse). For example, the PCM 114 may control one or more of a vehicle engine, vehicle motors, battery pack(s), a steering system, a transmission system, and the like. As described more below, computer 20 may communicate with PCM 114 to change one or more aspects of vehicle steering, vehicle speed, vehicle acceleration, etc. in order facilitate a UAV docking procedure, a UAV refueling event, a UAV undocking procedure, or the like. In at least one example, the PCM 114 facilitates driving vehicle 12 in a fully autonomous mode; however, this is not required.

It should be appreciated that while the onboard computer 20, positioning unit 108, wireless communication module 110, HMI 112, and PCM 114 have been described as individual computing devices, any two or more of these devices may be a single computing device. For example, computer 20 and wireless communication module 110 could be a single computing device; however, this is merely one non-limiting example. Other integrated computer examples also exist.

FIG. 4 illustrates that vehicle 12 may communicate with the UAV 14—directly or via a remote server 116—using a wireless communication network 120, a land communication network 122, or both. The remote server 116 may be programmed to receive fuel delivery requests from vehicles such as vehicle 12. And in response to such requests, server 116 may transmit the fuel delivery request to a particular UAV (e.g., such as UAV 14). Thus, according to one aspect, server 116 may behave as a hub, managing fuel delivery requests from many vehicles—and instructing particular UAVs to respond to the respective requests based on location, workload balancing, etc.

Server 116 may comprise one or more processors, memory, databases, and the like—and such processor(s) and memory may be similar to the processor and memory of computer 20, except that the instructions stored on the server memory (which are executable by the server processor(s)) may differ—namely, the server 116 instead may be programmed with unique instructions which enable the server 116 to carry out management of a fleet of UAVs and delivery requests from multiple vehicles. Server databases may store information pertaining to the routing paths of the UAV fleet, account data associated with multiple users, multiple vehicles, etc.

Wireless communication network 120 may include satellite communication architecture and/or may include cellular telephone communication over wide geographic region(s). Thus, in at least one example, network 120 includes any suitable cellular infrastructure that could include eNodeBs, serving gateways, base station transceivers, and the like. Further, network 120 may utilize any suitable existing or future cellular technology or protocol (e.g., including LTE, CDMA, GSM, etc.).

The land communication network 122 can enable connectivity to public switched telephone network (PSTN) such as that used to provide hardwired telephony, packet-switched data communications, internet infrastructure, and the like. Thus, in at least one example, vehicle 12 may send and receive wireless messages (e.g., using wireless communication module 110), and the land communication network 122 may receive these messages and convey them between the wireless communication network 120 and the server 116.

As shown in FIG. 4, unmanned aerial vehicle (UAV) 14 (e.g., a so-called drone, unmanned aircraft system (UAS), etc.) may be any suitable aircraft which is operated and controlled at least partially, if not entirely, by one or more computers 130 onboard the UAV 14 itself. Thus, like vehicle 12, the UAV 14 may be operated in a fully autonomous mode, wherein no human interaction is required. Flight controls, steering, stabilization, navigation, delivery of fuel parcels, and/or the like may be carried out using UAV computer 130 that stores and executes instructions using one or more processors 132 and memory 134. Processor(s) 132 and memory 134 of the UAV computer 130 may be similar to the processor and memory described above (e.g., of computer 20), except that processor(s) 132 execute programming instructions unique to the UAV 14 and its functionality. For example, among other things, the instructions stored in memory 134 may include: receiving a fuel delivery request from vehicle 12; determining the nature of the fuel delivery request (e.g., type of fuel, destination, etc.); determining which of a plurality of UAVs should fill the request by coordinating deliveries with other similarly-programmed UAVs; receiving or procuring a fuel parcel 140, according to the type of fuel requested by the vehicle; locating and navigating to a respective vehicle which sent the request; when within a proximity of the respective vehicle, identifying a beacon signal transmitted from the vehicle enabling the UAV to pinpoint a more precise location of the respective vehicle; communicating wirelessly with the vehicle (e.g., such as via wireless communication module 110 and via any suitable wireless protocol—e.g., including but not limited to Wi-Fi, Wi-Fi Direct, Bluetooth, etc.); encrypting and/or decrypting wireless messages sent and received, respectively, between the UAV and the vehicle; executing a docking procedure enabling the UAV to land on the vehicle while the vehicle is stationary or moving; executing a fuel parcel delivery function to provide a fuel payload to the respective vehicle; executing an undocking procedure enabling the UAV to take-off from the respective vehicle while the vehicle is stationary or moving; and/or executing a return-to-home procedure so that the UAV can repeat a delivery process that includes any one or more of instructions listed above.

Thus, in addition to having one or more computers such as the one described above, UAV 14 may have a positioning unit 142 (e.g., that may be similar to the vehicle positioning unit 108 described above) and a telematics unit 144 enabling the UAV to communicate wirelessly via any suitable cellular and/or short range wireless protocol (e.g., LTE, GSM, CDMA, etc. and/or Wi-Fi, Wi-Fi Direct, Bluetooth, etc.). The onboard computer 130, positioning unit 142, telematics unit 144, and other devices may be interconnected via any suitable onboard wired or wireless connection interface (not shown)—e.g., including one or more data buses, one or more power buses, discrete connections, etc. Further, units 142, 144 may carry out functions similar to those described above (e.g., regarding respective devices 108, 110) except that the functions may be associated with UAV 14 instead. Therefore, these devices will not be explained in great detail here.

Figure 5:
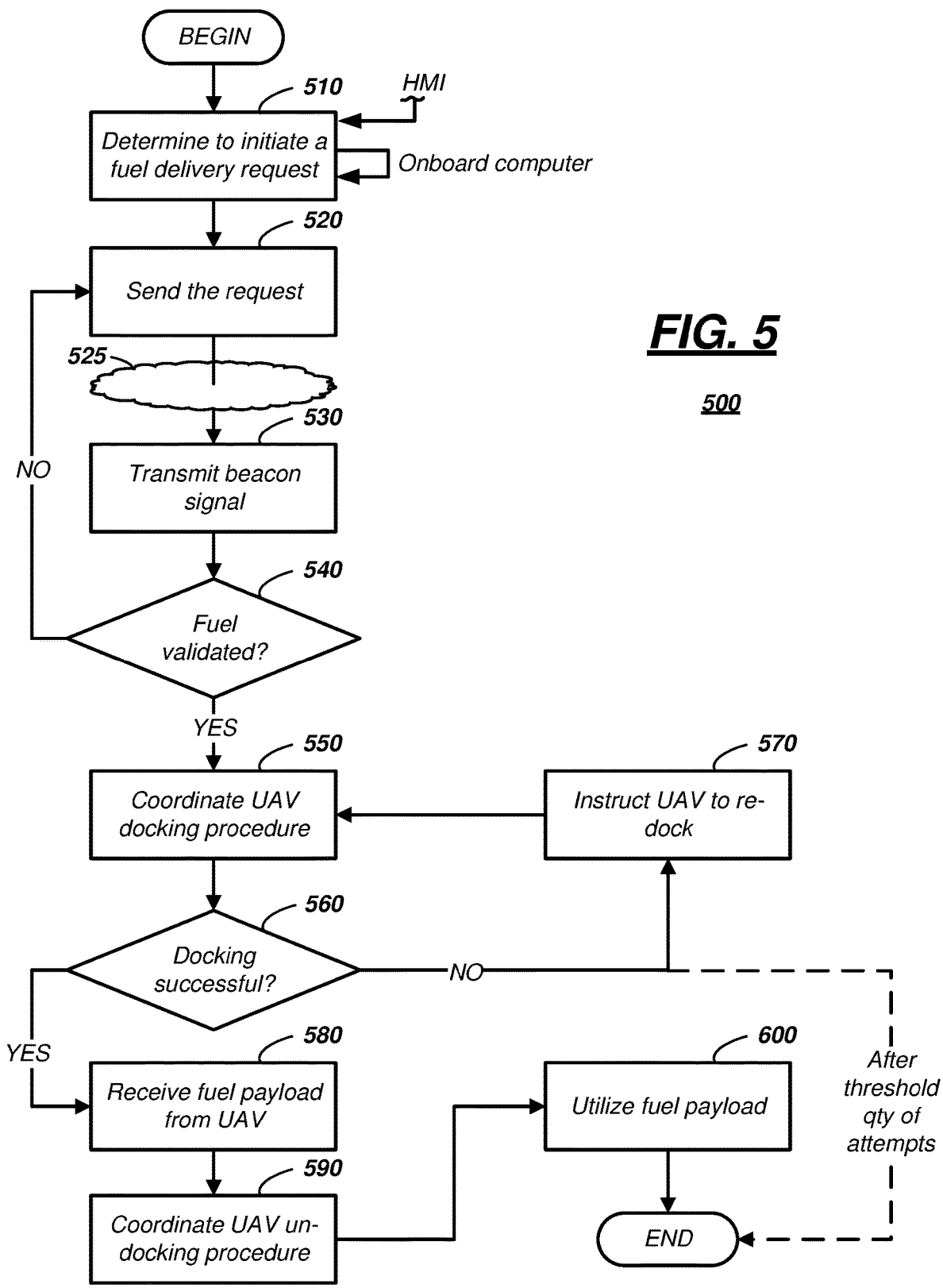
FIG. 5 is a flow diagram of a process of receiving fuel at a vehicle using a UAV.

Turning now to FIG. 5, a process 500 is shown of providing fuel to vehicle 12 using UAV 14. The process begins with block 510 wherein the onboard computer 20 determines to initiate a fuel delivery request. This determination may be based on user input via HMI 112 (e.g., actuating a button or switch on HMI, by making a touchscreen selection on HMI, etc.), wherein a user includes any person authorized to use and/or operate vehicle 12 (e.g., a licensee or owner of the respective vehicle 12). Other user-initiated examples include the user providing the indication via his/her mobile device (which is in communication with module 110) or the like.

According to another example of block 510, the computer 20 determines to initiate the fuel delivery request at any suitable time after a volume of fuel ($\text{Res}_{VOL}$) in chamber 22 is less than a first threshold (T1). The fuel volume ($\text{Res}_{VOL}$) within chamber 22 may be calculated by computer 20 using data from sensor 47. And the first threshold (T1) may be a difference between a calculated fuel volume ($\text{Main}_{VOL}$) within tank 24 (e.g., determined using data from sensor 32) and a total volumetric capacity thereof ($\text{Main}_{CAP}$); e.g., wherein $T1=\text{Main}_{CAP}-\text{Main}_{VOL}$. Using this example, computer 20 may carry out block 510 when $\text{Res}_{VOL} \leq T1$ (or $\text{Res}_{VOL} \leq (\text{Main}_{CAP}-\text{Main}_{VOL})$). In another example, block 510 is carried out when $\text{Main}_{VOL}/\text{Main}_{CAP}$ is less than a second threshold (T2) (e.g., less than 50%, 25%, 10%, etc.). In another example, block 510 is carried out when $\text{Res}_{VOL} \leq T1$ and when $(\text{Main}_{VOL}/\text{Main}_{CAP}) < T2$. Thus, the thresholds T1, T2 can minimize the likelihood of tank 24 becoming over-filled.

In at least one other example, computer 20 determines to initiate the request based on: performing a fuel efficiency calculation with respect to the amount of fuel needed to reach a predetermined destination and determining that the remaining fuel in the main fuel tank 24 is insufficient to reach the destination. The fuel efficiency calculation may include determining average fuel consumption by the engine of vehicle 12 for so-called city driving, highway driving, the nature of the remaining trip to the predetermined destination (e.g., what percentage is city driving, what percentage is highway driving, traffic conditions (heavy, moderate, light), etc.); in general, calculating fuel efficiency based on the engine efficiency of vehicle 12, its transmission, climate control systems, etc. is known to skilled artisans and therefore, such calculations will not be addressed further here.

In block 520 which follows, computer 20 sends a fuel delivery request based on the determination to initiate in block 510. Block 520 may include, prior to sending the request, computer 20 determining destination data associated with vehicle 12 (e.g., by determining an address, GPS coordinates, or the like), current location data associated with vehicle 12 (e.g., by determining an address, GPS coordinates, or the like), and/or heading data associated with vehicle 12 (e.g., direction, speed, route, etc.) from the positioning unit 108—e.g., so that the UAV 14 may be able to locate the vehicle 12 at the time of delivery. As explained below, in one example, the UAV 14 will deliver the fuel parcel to the current location data—e.g., when the vehicle 12 remains stationary. In another example, the UAV 14 will deliver the fuel parcel to the destination data—when the UAV 14 is likely to arrive with the parcel at a time when the vehicle 12 has reached its destination. And in another example, the UAV 14 can deliver the fuel parcel to moving vehicle 12—e.g., using the destination, current location, and/or heading data.

Upon receipt of this information from the positioning unit 108, computer 20 may compile a message payload that includes the destination, location, and/or heading data, as well as vehicle identifier data, a fuel type data, user account data, homing data, and/or UAV data. The identifier data may be unique to the vehicle 12—non-limiting examples include a vehicle identification number (VIN), an internet protocol (IP) address (e.g., associated with the wireless communication module 110), a mobile identification number (MIN) associated with an embedded cellular chipset in module 110 (or a chipset in an associated mobile device paired with module 110), a mobile telephone number (e.g., associated with the chipset in module 110 (or with the chipset the paired mobile device), etc. In at least one example, the identifier data includes encryption key or the like—e.g., according to one non-limiting example, the identifier data includes a private key (e.g., according to a public key infrastructure) and a VIN that is encrypted using an associated public key.

A fuel type data may be a unique identifier indicating what type of fuel is requested. For example, in combustion vehicles, the computer may request a fuel type associated with unleaded gasoline, a particular octane level of unleaded gasoline (e.g., 87, 89, 93, or the like), diesel fuel, kerosene, liquefied petroleum gas, and the like. However, as will be apparent from the description below, process 500 may be carried out using electric or hybrid vehicles as well. Thus, in some examples, the fuel type data may identify a particular type of electric battery (e.g., a lead-acid (PbA) battery, a lithium-type battery (e.g., a Li-Ion battery), an ultra- or super-capacitive battery, or the like), a battery size (e.g., a standard size, dimensions, etc.), a combination thereof, or the like. In at least one example, the computer may request that a UAV 14 bring a fuel parcel in the form of a wireless charger—thus, e.g., the fuel type data further may include desired wireless charging parameters such as a voltage level, a charging rate, etc.

User account data may include any information identifying a user of vehicle 12 and/or his/her associated payment information. For example, user account data may comprise a user's bank account and routing number (e.g., for electronic fund transfers), a user's credit card number (e.g., for credit transactions), etc. In this manner, an operating entity of UAV 14 or remote server 116 may charge the user of vehicle 12 for the fuel delivery.

Homing data may include any suitable identifying information that enables UAV 14 to identify the vehicle 12 when UAV 14 approaches vehicle 12 to deliver the fuel parcel. As will be described more below, the homing data may be used by UAV 14 to identify a wireless beacon signal from vehicle 12—e.g., including but not limited to a cellular transmission, a short range wireless transmission (e.g., Bluetooth, Wi-Fi, etc.), a light transmission (e.g., in the visible or non-visible spectrum), an audible transmission at any suitable frequency (ies), or the like.

For example, the homing data sent in the fuel delivery request may include the vehicle identifier or any other data to later uniquely identify vehicle 12. In at least some examples, the homing data is associated with an encryption scheme. For example, the homing data may comprise a private key according to a public key infrastructure. In this manner—and as will be described below—when the vehicle 12 (having an associated public key) wirelessly transmits the beacon signal (e.g., via Bluetooth), only the UAV 14 carrying the private key may be able to interpret the beacon and identify the vehicle 12. In other examples, other wireless protocols (e.g., other than Bluetooth) may be used and/or other secure forms of wireless communication may be used, including symmetric or shared secret schemes and the like.

UAV data includes any suitable information pertaining to the desired UAV, the desired UAV-servicing entity, the desired remote server 116, etc. which operates the UAV 14. For example, UAV data may comprise identifier of the UAV 14, server 116, associated entity, etc. (e.g., a telephone number, an IP address, or the like). In this manner, the vehicle 12 (or user of the vehicle) can select a preferred fuel delivery vendor and/or can communicate with the UAV 14 directly.

Once suitable data is compiled in the message payload of the fuel delivery request, in block 520, the computer 20 sends the request to the UAV 14, the server 116, or the like. Following wireless transmission from vehicle 12, the wireless communication module 110 may receive a response. According to one example, the fuel delivery request first is received at the remote server 116, which sends an ACK (acknowledge) message to the vehicle 12. Thereafter, server 116, which may interact with multiple UAVs, determines which UAV to dispatch—e.g., based on proximity to vehicle 12, based on UAV demand or availability, a combination thereof, or the like. Upon making this determination, server 116 sends an instruction to a particular UAV (e.g., UAV 14) to deliver the requested fuel to vehicle 12.

In another example, at least some of these steps described above are carried out by UAV 14 without interaction by server 116. For example, the vehicle 12 and UAV 14 may communicate directly—e.g., without the server 116 acting as a hub.

Regardless of how UAV 14 receives the fuel delivery request, UAV 14 may retrieve and/or load a fuel parcel 140 and travel toward the vehicle 12 (shown as 525)—e.g., using its positioning unit 142, as well as the destination, location, and/or heading data received in the fuel delivery request. In at least one example (shown in at least FIG. 4), the fuel parcel 140 comprises a container 150 having a fuel nozzle 152 extending downwardly from a base of the container 150. The nozzle 152 may have an electronically-actuatable valve 154—e.g., permitting UAV computer 130 to control when to dispense liquid fuel therefrom.

Furthermore, in some examples, the fuel parcel retrieved and carried by the UAV 14 includes an identifier—e.g., identifying the particular type of fuel, its quantity, etc. In one example, the identifier is embodied as a bar-code which, when scanned by the UAV 14, enables the UAV 14 to compare the identifier with a look-up table in memory 134—thereby providing additional information regarding the fuel parcel. As explained more below (in block 540), UAV 14 may use data associated with this identifier when vehicle 12 validates the fuel type, quantity, parameters, etc.

When the vehicle 12 is stationary (e.g., when the vehicle 12 is in PARK or when the tank 24 of vehicle 12 is empty), UAV 14 may travel to a specific location using the location data provided in the fuel delivery request. In some circumstances, vehicle 12 may be proximate to other vehicles, and UAV 14 may not be able to resolve or pinpoint—based on destination, location, and/or heading data alone—which detected vehicle sent the fuel delivery request. Vehicle 12 however may transmit a beacon signal—e.g., which may bear a secure message (block 530). And in at least some examples—and the UAV 14 may identify the vehicle 12 using the beacon signal and/or the message thereof. In at least one example, UAV 14 transmits a wireless message when it determines that it is close to vehicle 12. And vehicle 12 responds by transmitting the beacon signal.

Continuing with the example set forth above, UAV 14 may: receive a Bluetooth beacon signal having message data (that includes an identifier that matches at least a portion of the identifier data sent in the request (of block 520)); decrypt the message data using the private key received via the fuel delivery request of block 520; determine the vehicle 12 is the intended recipient of the fuel parcel 140 based on the contents of the decrypted message; and then use direction-detection techniques to pinpoint the precise location of vehicle 12—e.g., as the vehicle 12 repeatedly emits the beacon signal. Direction-detection techniques include, among other things: received signal strength, angle of arrival (AoA), and/or time of flight (ToF), just to name a few non-limiting examples.

A similar procedure may be carried out when the vehicle 12 is or has been moving. For example, UAV 14 may be programmed to estimate a location of the vehicle 12 based on location data (at the time of the fuel delivery request), heading data, and/or destination data. Thus, UAV 14 may travel to this location and similarly attempt to identify vehicle 12 using the homing beacon.

In some examples, the UAV 14 may transmit a wireless message (e.g., such as cellular, short range wireless communication, etc.) requesting an update of location data, heading data, and/or destination data of vehicle 12. In this manner, UAV 14 may adjust its navigation accordingly. Regardless of how UAV 14 identifies vehicle 12, once UAV 14 is proximate to vehicle 12 (e.g., hovering overhead or nearby), UAV 14 may provide a message (e.g., which may be encrypted) to vehicle 12 indicating that it is present and that it has positively identified vehicle 12 (e.g., and/or that it has a line-of-sight).

Any time after UAV 14 departs toward the vehicle 12 with the fuel parcel 140, vehicle 12 may validate the type of fuel being carried by the UAV 14 and/or a quantity of fuel to be delivered (block 540). In at least one example, this occurs after the UAV 14 indicates that it has positively identified vehicle 12. For example, computer 20 may transmit a validation query to the UAV 14, and UAV 14 may reply with an answer. For example, if the vehicle 12 requested one (1) gallon of unleaded gasoline (87 octane), UAV 14 may reply that it is carrying unleaded (87 octane) and that it intends to deliver one (1) gallon to vehicle 12. In other examples (described more below), UAV 14 may reply that its fuel parcel is a battery having voltage, Amp-hours, size, etc. consistent with the fuel delivery request sent by vehicle 12 in block 520. Or for example, as also explained more below, UAV 14 may reply that that its fuel parcel is a wireless charger and that it intends to deliver a predetermined number of amp-hours of charge at a predetermined voltage (e.g., which is consistent with the fuel delivery request sent in block 520 as well). These are merely non-limiting examples; other examples are possible as well.

If the fuel (e.g., type, quantity, etc.) is not validated, then the process 500 may loop back and repeat block 520—e.g., computer 20 may be programmed to send another fuel delivery request. Or UAV 14 may address the issue by departing and returning with the correct fuel. Or UAV 14 may depart and a different UAV may deliver the desired parcel instead. However, if the fuel is validated, then process 500 may continue to block 550.

In block 550, computer 20 may coordinate a docking procedure of the UAV 14. This may include computer 20 determining whether conditions are suitable for docking, adjusting the speed of vehicle 12, instructing UAV 14 to stand-by (e.g., until a straight stretch of roadway becomes available), sending message to the UAV 14 instructing it to dock at the landing pad 80, actuating the locking feature(s) 82 (e.g., from a releasing position to a retaining position), and the like.

For illustration purposes only, consider the following examples. In a first docking procedure example, the vehicle 12 may be stationary—e.g., and computer 20 may determine that vehicle 12 is in PARK. Under these or similar circumstances, computer 20 may determine that conditions are suitable for docking. Thus, computer 20 may transmit a message to UAV 14 instructing it to land on landing pad 80. After landing, the UAV 14 may send a message to computer 20 indicating it has landed; thereafter, computer 20 may actuate locking feature(s) 82 to the retaining position. And thereafter, the UAV 14 may be docked.

In at least one instance, the docking procedure includes computer 20 actuating the port 42 to the open position so that as the UAV 14 descends toward the vehicle 12, nozzle 152 may be guided into the port 42. Further, in at least one example, computer 20 actuates the moving elements 76 of an iris diaphragm to the open position, as discussed above. Computer 20 also may electronically actuate valve 66 to an open position as well. As described above, valve 66 may be biased to the closed position via spring 68 (e.g., so that when the nozzle 152 is removed and in the absence of electronic actuation by computer 20, valve 66 moves to the closed position). As discussed more below, in other examples, the port 42 and/or valve 66 may not be actuated until after the docking procedure.

In response to receiving a message from UAV 14 indicating that it has landed, computer 20 may determine whether the UAV 14 is docked to the vehicle 12 and/or whether the docking was successful (block 560). In one example, computer 20 may determine whether the locking feature(s) 82 are properly actuated. For example, if the feature(s) 82 are in the retaining position and are otherwise actuated properly, the computer 20 may determine that the docking procedure was successful (and process 500 may proceed to block 580). However, if the feature(s) 82 are not in the retaining position or are otherwise not actuated properly—e.g., due to interference with the UAV or another object, or an absence of contact with a corresponding lock feature (not shown) on UAV 14—computer 20 may determine the docking to be unsuccessful. If determined to be unsuccessful, then computer 20 may instruct the UAV 14 to re-execute the docking procedure (block 570). Thereafter, computer 20 may repeat blocks 550 and 560 until the UAV 14 successfully docks, or until a threshold quantity of attempts have been executed. If the threshold quantity of attempts is executed and UAV 14 has not successfully docked, process 500 may be terminated, a new fuel delivery request may be made by computer 20, or the like.

In another example of determining whether the docking is successful, computer 20 determines success or failure based on a message sent from the UAV 14—e.g., indicating whether the UAV 14 determines the docking to be a success or failure. For example, the UAV 14 may have any number of sensors onboard (not shown)—including visual sensing equipment, cameras, and the like—enabling UAV computer 130 to determine a successful docking procedure based on its sensor data. Thus, when making the determination of whether the docking is successful, computer 20 may rely (at least in part) upon the UAV computer's (130) determination.

In a second docking procedure example of block 550, the vehicle 12 is moving during the procedure. Prior to instructing UAV 14 to land at the landing pad 80, computer 20 may determine—e.g., using various sensors (not shown) on vehicle 12 and the like—whether conditions are suitable for docking based on: vehicle speed, roadway conditions (e.g., amount of turning in the next several units of distance, accelerating and/or decelerating in the next several units of distance), and/or weather conditions (e.g., wind, rain, snow, etc.). If conditions are suitable, the docking procedure (block 550), the determination whether successful (block 560), the instruction to re-dock as necessary (block 570), etc. may proceed as described above in the first docking procedure example.

However, if the computer 20 determines that the docking procedures are not suitable, then computer 20 may send a wireless message via network connection 106 to HMI 112 (e.g., to display to a user) or to the PCM 114 (e.g., when vehicle 12 is operated in an autonomous mode) to slow down the vehicle 12 and/or place the transmission in PARK. In at least one example, the docking procedure occurs while the vehicle 12 is being operated in a fully autonomous mode. Unsuitable docking conditions may be associated with roadway conditions (snowy and/or icy roadway conditions, bumpy roadway conditions due to an uneven roadway surface), weather conditions (windy conditions, rainy conditions, snowy conditions, icy conditions, etc.), vehicle movement conditions (vehicle speed conditions, vehicle turning or steering conditions, etc.), and the like.

In another second docking procedure example, computer 20 may determine to delay docking for a predetermined amount of time or distance. For example, computer 20 may determine, using data from positioning unit 108, that roadway conditions will improve in the predetermined amount of time or distance (e.g., a roadway surface may be less bumpy, the roadway may be straighter, rain or snow will cease in the next few minutes, etc.). Accordingly, computer 20 may send a wireless message to UAV 14 requesting it stand-by.

And once the conditions are determined by computer 20 to be suitable for docking, the docking procedure for moving vehicle 12 may proceed similarly as the docking procedure for the stationary vehicle 12 (as described above). In at least one example, moving vehicle 12 may determine to stop and re-attempt to dock the UAV 14 if repeated moving-vehicle attempts fail (e.g., this may occur following a threshold quantity of attempts); thus, computer 20 may instruct the user via HMI 112 (or the PCM 114—e.g., when vehicle 12 operates in a fully autonomous mode) to safely stop the vehicle 12 to permit the docking procedure.

In block 580, a UAV-to-vehicle transfer of the fuel parcel 140 is made. In at least one example, computer 20 already may have actuated the port 42 and/or valve 66 to the open positions thereby permitting the UAV nozzle 152 to be located within the passage 60. If the port 42 and/or valve 66 has not already been moved to these open positions, computer 20 may actuate one or both to the open position at this time. In this latter instance, UAV computer 130 may cause nozzle 152 to descend (translate, telescopically descend, etc.) into passage 60. Once the nozzle 152 is located within the passage 60 and the valve 66 is open, UAV 14 may transmit a message to computer 20 indicating its readiness to dispense liquid fuel into chamber 22.

In response, the computer 20 may send an acknowledge (ACK) and a dispense instruction to UAV 14. Thereafter, UAV 14 may release the fuel payload (e.g., in this case, liquid fuel of a predetermined quantity from the container 150) into the chamber 22. When the UAV 14 determines the proper payload is transferred to the chamber 22, the UAV 14 may transmit a message to computer 20 indicating completion. Continuing with the example above, UAV 14 may transfer one (1) gallon of fuel (e.g., even though it may carry more than 1 gallon in container 150). As discussed above, if at any time during the transfer, UAV 14 suddenly becomes dislodged from vehicle 12, suddenly departs, etc., valve 66 will move the closed position—e.g., being so biased by spring 68—thereby inhibiting contaminants from entering the chamber 22.

Upon receipt of the fuel payload, computer 20 may validate the delivery. In this case, computer 20 may determine a quantity of liquid fuel delivered to the chamber using the sensor 47. When the measured liquid fuel is determined to be equal to the requested fuel amount, the computer 20 may transmit a wireless message to the UAV 14 indicating acceptance of the fuel delivery. In instances where the measured fuel is not commensurate with the requested quantity (e.g., as requested in the fuel delivery request), computer 20 may transmit a wireless message to the UAV 14 (or server 116) indicating the discrepancy so that the user later may address the discrepancy (e.g., and request a partial refund or the like).

Thereafter, computer 20 may coordinate a UAV un-docking procedure (block 590). For example, computer 20 may: actuate the lock feature(s) 82 to the released position so that UAV 14 is no longer tethered or retained; send a wireless instruction to the UAV 14 to undock; and move the port 42 to the closed position at any suitable time (e.g., before, during, and/or after the UAV 14 fully executes the undocking procedure), just to list a few non-limiting examples. The un-docking procedure also may comprise computer 20 instructing the vehicle user (via HMI 112) and/or PCM 114 to alter the speed and/or steering of vehicle 12 due to weather conditions, roadway conditions, vehicle movement conditions, etc.—so that UAV 14 may undock safely. Such conditions were previously discussed above (e.g., with respect to the docking procedure).

Vehicle 12 may utilize the fuel payload (block 600) at any time after the fuel payload is received. In at least one example, the computer 20 releases the liquid fuel into the main fuel tank 24 after the UAV 14 has un-docked and/or after valve 66 has been moved to the closed position—e.g., to minimize the likelihood of receiving contaminants into chamber 22. In another example, computer 20 determines that port 42, valve 66, or both are in the closed position (e.g., senses or otherwise determines their respective states), and in response to this determination, computer 20 electronically actuates valve 54 to the open position thereby dispensing fuel from the chamber 22 to main fuel tank 24. Concurrently, computer 20 may open vent valve 90 so that liquid fuel fully dispenses from chamber 22 without creating a vacuum state within the chamber 22 (e.g., opening valve 90 may be particularly helpful when chamber 22 is substantially smaller than tank 24).

In another example, computer 20 may receive an indication of a change in fuel level in main fuel tank 24 via data from sensor 32 and compare this indication with the amount of fuel determined to be delivered by UAV 14. If computer 20 determines a difference between the quantity of fuel detected by sensors 32 and 47 greater than a threshold, computer 20 may trigger and store a diagnostic trouble code—e.g., which may be addressed by authorized service personnel at a later time. Other examples also exist.

Block 600 further also may include computer 20 controlling valves 90, 96 in any suitable manner to utilize the evaporative control system 84. For example, computer 20 may actuate vent valves 90 to recapture fuel vapor from chamber 22 (and respectively condense the vapor to liquid again). And computer 90 may actuate valve 96 to provide this recaptured fuel from canister 86 to the engine.

Utilization of the fuel payload (block 600) may differ in other examples. For example, as will be explained more below, when the payload is an auxiliary electric battery, the battery may be electrically coupled to a vehicle power bus, a primary vehicle battery, or the like. Or for example, when the payload is a wireless charge, this power can be similarly coupled to the power bus, primary battery, etc. Following block 600, process 500 may end.

Figure 7:
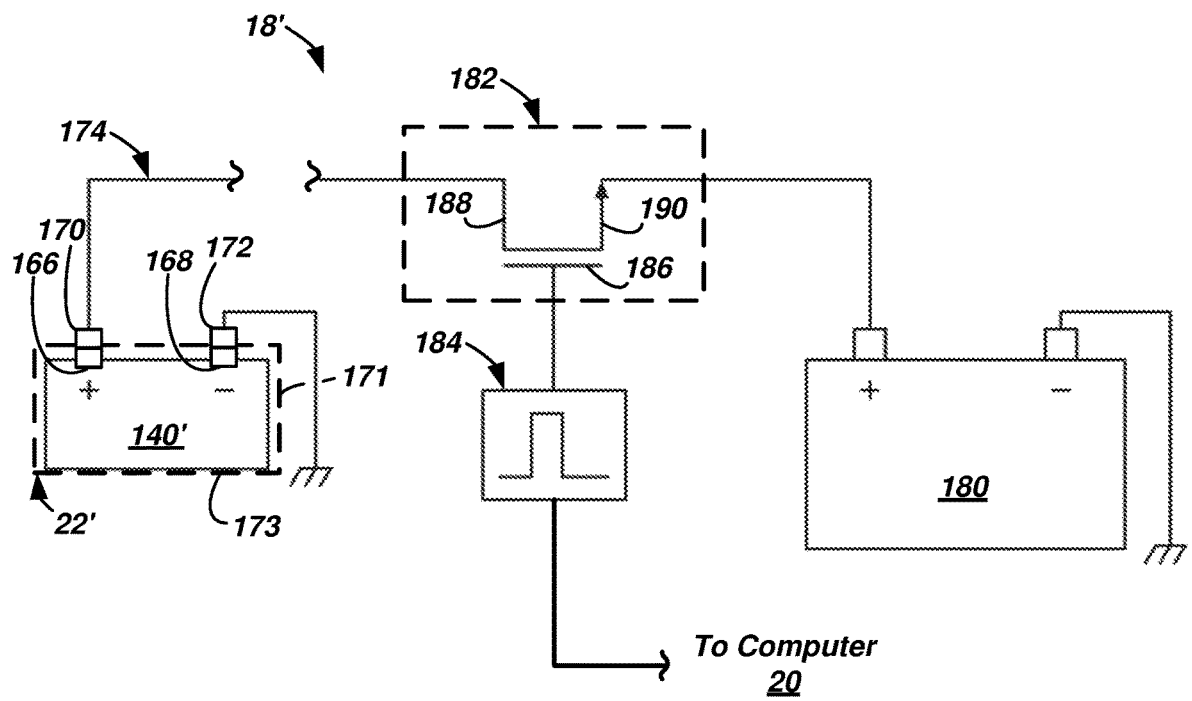
FIG. 7 is a schematic view of an extend-range fueling system, according to the example shown in FIG. 6.
Figure 6:
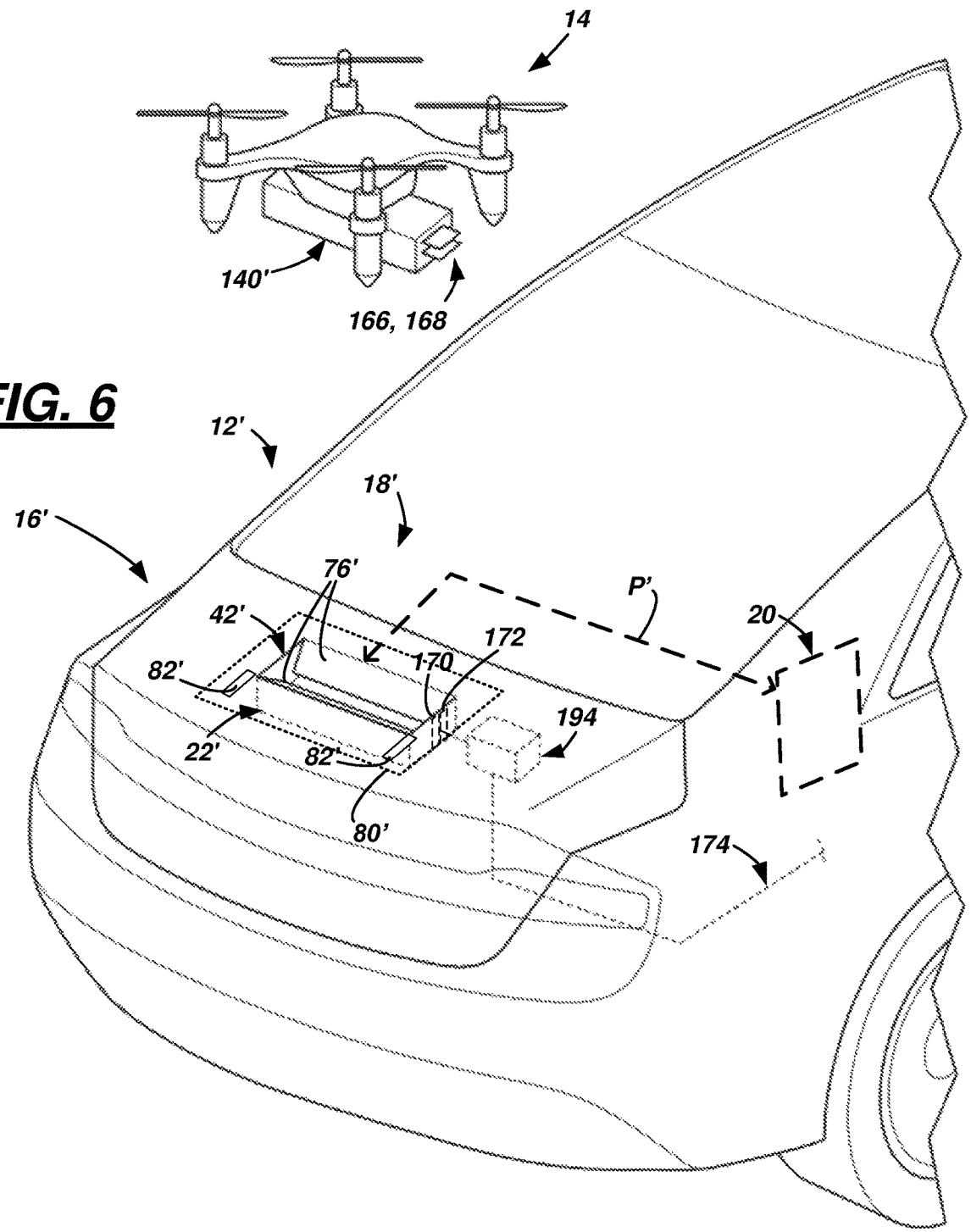
FIG. 6 is a perspective view of a portion of another example of a mobile refueling system.
Figure 8:
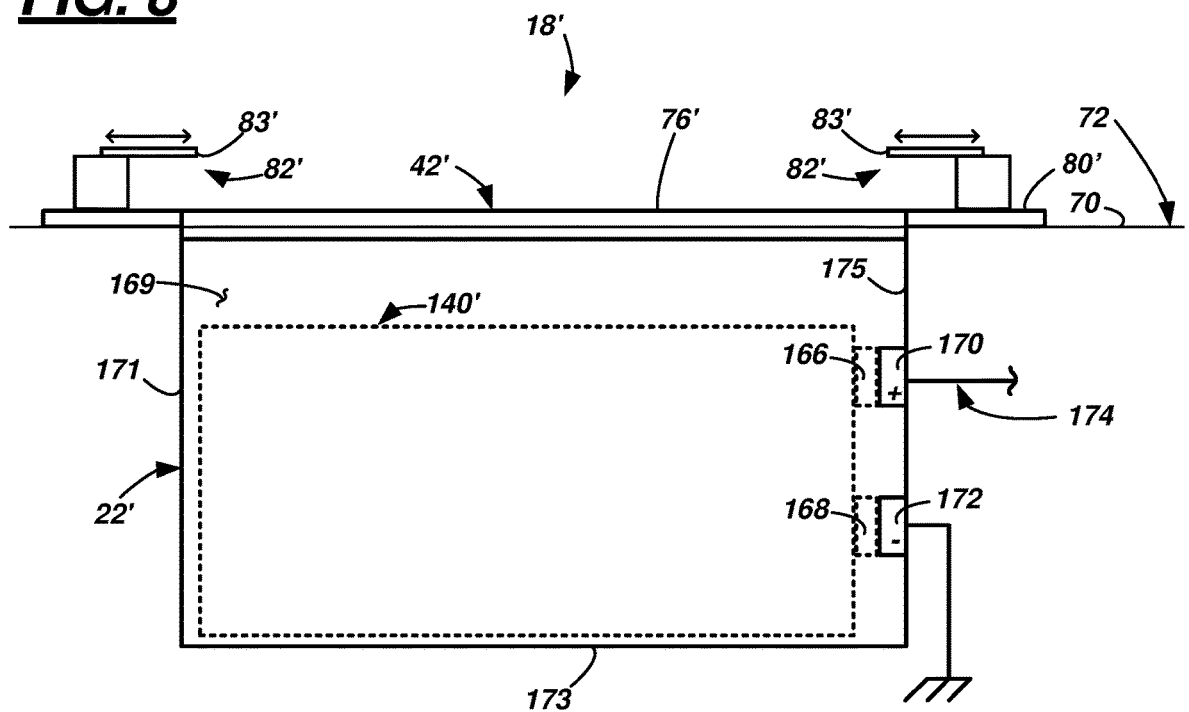
FIG. 8 is a partial schematic view of the extend-range fueling system shown in FIG. 7.

Other examples of fuel-receiver 18 exist as well—e.g., designated hereafter using like reference numerals. For example, as shown in FIGS. 6-8, UAV 14 may deliver a fuel parcel 140' in the form of an auxiliary vehicle battery to a fuel-receiver 18' on vehicle 12' (e.g., which may be an electric vehicle in this case). Auxiliary battery 140' may have any suitable size, shape, and/or electrical characteristics (e.g., voltage, amperage, etc.); battery 140' may include a pair of electrical terminals 166, 168 for conducting power to vehicle 12'. Here, fuel-receiver 18' may include a chamber 22' having a volume 169 defined by a plurality of walls 171, a base 173, and a port 42' (e.g., wherein port 42' can be an upper boundary thereof). Port 42' may comprise one or more movable elements 76'. In the illustrated example, the elements 76' include two bay doors which are hinge-ably coupled to two opposite walls 171 and which can be electronically actuated by computer 20 (via connection P') to move the doors from a closed position to an open position so that UAV 14 may deliver the auxiliary battery 140'. In at least one example, doors 76' open inwardly (e.g., into the volume 169) so that the doors 76' do not interfere with UAV landing, docking, etc. However, this is not required.

The chamber 22' may have a pair of correspondingly-spaced electrical terminals 170, 172 (e.g., a cathode and an anode) at an inner surface 175 of at least one of the walls 171 to permit delivery of electrical energy from the auxiliary battery 140' to a vehicle power bus 174. The power bus 174 may be coupled (e.g., by wire) to a primary vehicle battery 180 via a switch 182 (e.g., a transistor) and a charge controller 184, as shown in FIG. 7. In one example, the charge controller 184 may be coupled to a gate 186 of the switch 182, auxiliary battery 140' may be coupled to a source 188 thereof, and primary battery 180 may be coupled to a drain 190 thereof. Charge controller 184 (e.g., a so-called power regulator) can be adapted to inhibit overcharging of primary battery 180—the construction and implementation of charge controllers is known to skilled artisans; therefore, controller 184 will not be described in greater detail here. The charger controller 184 may be actuated or triggered by computer 20; and in one example, computer 20 stores and executes charge controller instructions (i.e., the charge controller 184 is part of computer 20). Thus, during operation, when the gate 186 is actuated (e.g., with a suitable electrical voltage or current), current from the auxiliary battery 140' may be provided through element 182 to primary battery 180.

Thus, in at least one example, the fuel parcel 140' (the auxiliary battery) is also the fuel payload, and process 500 may proceed similarly. For instance, computer 20 may execute the blocks 510-600 in a similar or identical manner, as described above. For example, determining to initiate the fuel delivery request may include a determination of a low threshold voltage circumstance of the primary battery 180 (e.g., determined by the user and/or the PCM 114). The fuel delivery request in block 520 may indicate a different type of fuel (e.g., a suitable auxiliary battery 140'). In block 540, computer 20 may validate the fuel by validating battery characteristics such as the type of battery (e.g., a lead-acid (PbA) battery, a lithium-type battery, an ultra- or super-capacitive battery, etc.), the battery size (e.g., a standard size, dimensions, etc.), a combination thereof, or the like. Further, during the docking procedure (550), UAV 14 may land on pad 80' and couple to locking features 82', and computer 20 may control the bay doors 76'—or alternatively, the doors 76' may be opened after docking (as discussed above). Receiving the fuel payload (580) may include receiving the auxiliary battery 140' into the chamber 22'—e.g., in a manner such that the terminals 166, 168 (of auxiliary battery 140') contact the terminals 170, 172, respectively (of the chamber 22'). And utilizing the fuel payload 140' may comprise computer 20 actuating the charge controller 184, as suitable, to deliver charge between auxiliary battery 140' and primary battery 180.

Other auxiliary battery examples also exist. For example, chamber 22' could have multiple slots for multiple auxiliary batteries deliverable by UAV 14. For instance, a first UAV could deliver one auxiliary battery into a first slot, a second UAV could deliver a second auxiliary battery into a second slot, etc.

In another example, UAV 14 may be programmed to remove contents from chamber 22' prior to or in addition to delivering auxiliary battery 140'. For example, UAV 14 could remove a previously delivered auxiliary battery or other object, and then deliver battery 140' in its place. Further, in at least one example, UAV 14 may pick-up auxiliary battery 140' without delivering another fuel parcel—e.g., when vehicle 12' is parked or the like—in this manner, UAVs could be programmed to pick-up depleted multiple auxiliary batteries during a period when delivery demand is lower. In these and other instances, computer 20 may be programmed to communicate with UAV 14 when the engine ignition state is OFF—e.g., carrying out any of the following instructions: transmitting a request a fuel pick-up request (e.g., to pick-up battery 140'); responding to a UAV wireless message requesting to pick-up (e.g., within short range wireless communication of vehicle 12')—which may or may not be associated with a request originating at computer 20 to pick-up; transmitting a beacon signal to assist UAV 14 to find vehicle 12' (similar to block 530); coordinating a docking and undocking procedure (e.g., similar to blocks 550, 560, 570, 590); providing access to the chamber 22' (e.g., as in block 580), and the like.

In at least one example of fuel-receiver 18', vehicle 12' includes a boost converter 194 coupled between chamber 22' and power bus 174. Boost converter 194 can be adapted change at DC voltage from battery 140' to a higher (or lower) DC voltage (e.g., to boost voltage from 6V (of battery 140') to 12V (of bus 174))—thereby matching voltage of auxiliary battery 140' to the primary battery 180. The construction and implementation of boost converters is known to skilled artisans; therefore, converter 194 will not be described in greater detail here.

Figure 10:
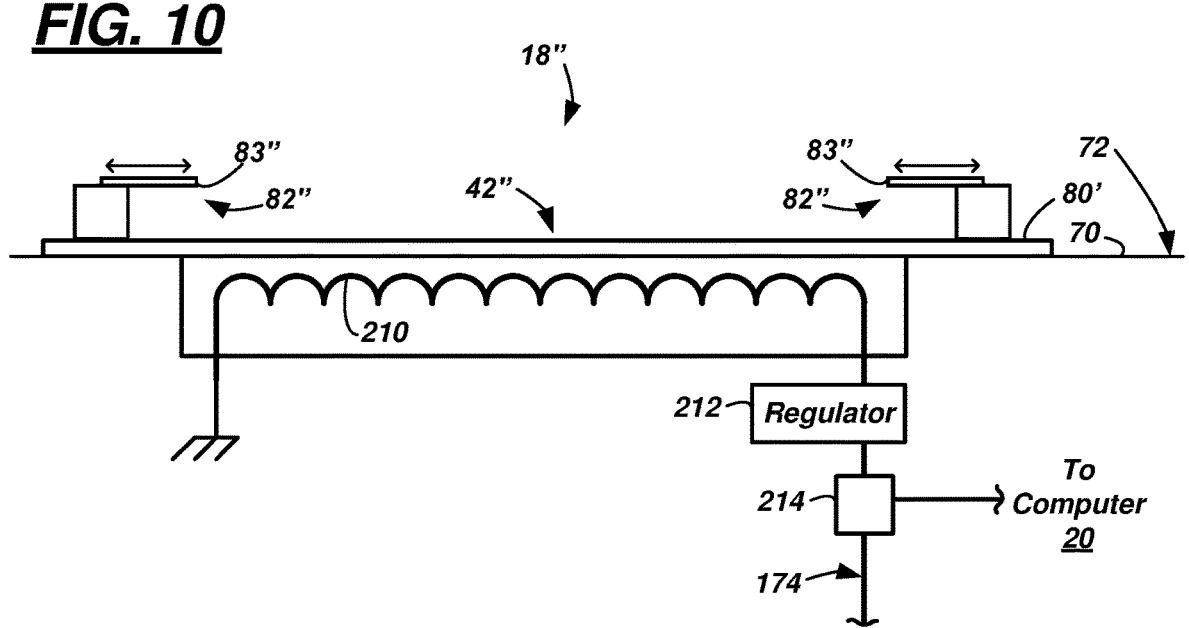
FIG. 10 is a schematic view of an extend-range fueling system, according to the example shown in FIG. 9.
Figure 9:
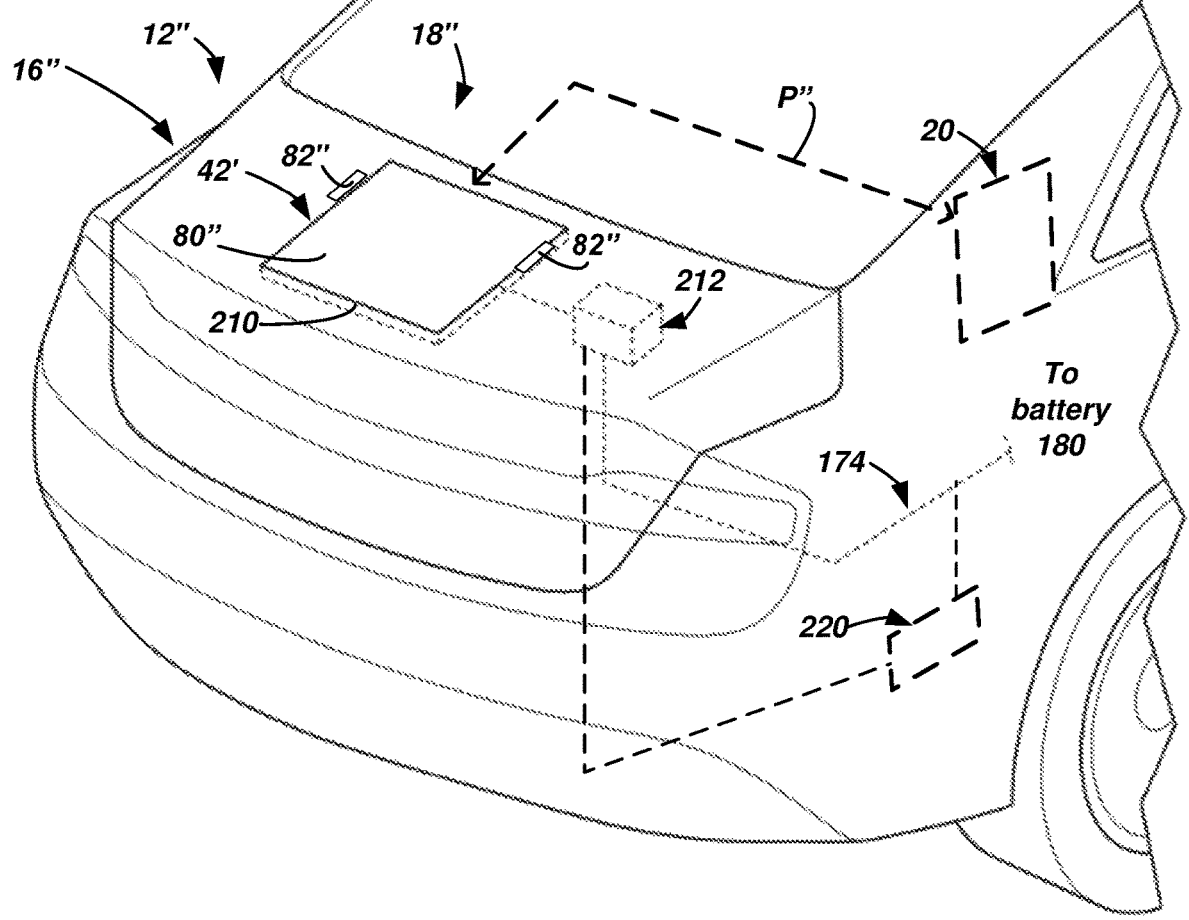
FIG. 9 is a perspective view of a portion of yet another example of a mobile refueling system.

Other fuel-receiver examples exist as well, as shown in FIGS. 9-10 (see fuel-receiver 18"). UAV 14 may deliver a fuel parcel 140" comprising a wireless charger (e.g., wherein the payload is electrical energy in the form of electrical charge). Fuel parcel 140" may include a battery 200, a transformer 202, and a transmitter coil 204, wherein the computer 130 on UAV 14 is programmed to actuate the transmitter coil 204 to wirelessly charge another device—e.g., such as fuel-receiver 18" on vehicle 12" (e.g., which again may be an electric vehicle). More particularly, power from battery 200 may be stepped up by transformer 202 before wireless transmission by coil 204, as is known in the art. Fuel-receiver 18" may include: a port 42" that comprises a landing pad 80" (which may include features 82", tabs 83", etc.), a receiver coil circuit 210, a voltage regulator circuit 212 coupled to coil circuit 210, and a switch 214 (shown in FIG. 10). The receiver coil circuit 210 may be located within, below, or otherwise proximate to the landing pad 80" so that when UAV 14 docks to vehicle 12" and actuates the transmitter coil 204, power may be wirelessly received at the coil circuit 210, regulated at circuit 212, and provided to bus 174 when switch 214 is electronically actuated to an open position by computer 20. In at least one example, the switch 214 is in a closed position until after the UAV 14 has docked and/or computer 20 has validated the fuel payload carried by the UAV. Fuel-receiver 18" may comprise other circuits, elements, etc. (not shown) as well—e.g., including but not limited to filtering circuits, signal-amplifying circuits, and the like.

Again, process 500 may proceed similarly as discussed above in the liquid fuel and/or auxiliary battery fuel systems—e.g., computer 20 executing blocks 510-600 in a similar or identical manner, as described above. For example, determining to initiate the fuel delivery request may include a determination of a low threshold voltage circumstance of the primary battery 180 (e.g., determined by the user and/or the PCM 114). The fuel delivery request in block 520 may indicate a different type of fuel is desired (e.g., a wireless charge). In block 540, computer 20 may validate the fuel by validating that the UAV 14 bears a wireless charger; further, computer 20 may validate charging parameters (e.g., such as voltage level to be transmitted, charging rate, etc.). Docking may include computer actuation of feature(s) 82", as well as other similar aspects described above in blocks 550, 560, 570. Receiving the fuel payload (580) may include receiving the wireless charge of battery 200 at primary vehicle battery 180. More particularly, computer 20 may provide a wireless message to UAV 14 to start the wireless charging—e.g., upon actuation of switch 214—so that wireless energy received at coil circuit 210 may be regulated at circuit 212 and pass through switch 214 onto the power bus 174.

Alternatively, receiving the payload in block 580 could include receiving power (e.g., a wireless charge) via receiver coil circuit 210 into a temporary storage device 220 shown in FIG. 9 (e.g., an embedded auxiliary battery or the like); this device 220 could release the charge at any suitable time later. And in at least one example, utilizing the fuel payload 140' may occur concurrently with receiving the fuel payload—i.e., power from the wireless charge may be consumed by vehicle 12" even while the UAV 14 is docked.

Thus, there has been described a mobile refueling system for a vehicle. The system includes a vehicle and an unmanned aerial vehicle (UAV) that delivers fuel to the vehicle. Non-limiting types of fuel deliverable by the UAV include liquid fuel, a battery, and electrical charge (e.g., via a wireless charging device). The vehicle may comprise an extend-range fueling system that includes a computer programmed to, among other things, make a fuel delivery request, coordinate reception of fuel from the UAV, and coordinate a docking procedure of the UAV on the vehicle.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. the processor can receive the data from the sensors and determine, from the data, and generally control fuel-receiver functions, operations, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
a fuel-receiver for a non-aerial vehicle, the fuel-receiver comprising:
a port located on a vehicle surface of the non-aerial vehicle; and
a landing pad located on the vehicle surface of the non-aerial vehicle, the landing pad including a locking feature; and
an onboard computer programmed to:
send a fuel delivery request to a server;
instruct a communication module to transmit a beacon signal;
detect an approach of an unmanned aerial vehicle (UAV) to the non-aerial vehicle; and
responsive to a determination that the UAV is authorized to deliver fuel to the fuel-receiver:
actuate the locking feature from a closed position to an open position to enable the UAV to land on the landing pad; and
responsive to a determination that the UAV has landed on the landing pad:
actuate the locking feature from the open position to the closed position to secure the UAV to the landing pad; and
actuate the port to permit the UAV to deliver fuel.

2. The system of claim 1, wherein the fuel-receiver further comprises a chamber that is in fluid communication with the port via a first passage, wherein the chamber is in fluid communication with a main fuel tank via a second passage.

3. The system of claim 2, wherein the first passage includes a valve that is electronically-actuatable by the computer.

4. The system of claim 3, wherein the valve includes a spring that urges the valve to a closed position, wherein, when actuated by the computer, the valve moves to an open position, wherein, when not actuated by the computer, the valve moves to the closed position.

5. The system of claim 2, wherein the second passage includes a valve that is electronically-actuatable by the computer, wherein the computer is programmed to move the valve to an open position when the computer determines the port to be in a closed position.

6. The system of claim 2, wherein the second passage is in fluid communication with a fuel filler passage that includes a fuel filler opening for a fuel hose nozzle.

7. The system of claim 2, wherein a base region of the chamber is sloped relative to a roadway surface.

8. The system of claim 2, wherein the chamber comprises a fuel sensor that detects a quantity of fuel in the chamber.

9. The system of claim 2, wherein the port comprises one or more movable elements located at an opening to the first passage.

10. The system of claim 9, wherein the port comprises an iris diaphragm coupled to the computer, wherein a plurality of blades of the diaphragm are electronically movable between an open position and a closed position.

11. The system of claim 2, wherein the fuel-receiver further comprises an evaporative control system that recaptures fuel vapor from the chamber.

12. The system of claim 1, wherein the landing pad at least partially circumferentially encloses the port.

13. The system of claim 1, wherein the fuel-receiver further comprises a chamber defined by the port and a plurality of walls that carry a pair of electrical terminals.

14. The system of claim 13, wherein the fuel-receiver further comprises a switch and a charge controller, wherein the switch is coupled to the controller, at least one of the terminals, and a primary vehicle battery, wherein, when the switch is in a first position, current passes through the switch to the battery, wherein, when the switch is in a second position, current is inhibited from passing therethrough.

15. The system of claim 14, wherein the switch is coupled to the computer, wherein the computer is programmed to electronically actuate the switch.

16. The system of claim 13, wherein the port comprises one or more bay doors hingeably coupled to at least one of the plurality of walls.

17. The system of claim 1, wherein the fuel-receiver further comprises a receiver coil circuit, and a regulator circuit which further is coupled to a primary vehicle battery.

18. The system of claim 17, wherein the fuel-receiver further comprises a switch electronically-actuatable by the computer and coupled between the coil circuit and the battery, wherein, when the switch is in a closed position, the coil circuit is coupled electrically to the battery.

19. The system of claim 1, wherein the locking feature comprises movable tabs that are extendable over a retaining element of the UAV.

20. The system of claim 1, wherein the landing pad includes a slip-resistant coating.

\* \* \* \* \*